G. W. RINK.
COMBINED SCALE SHEATH AND CLEANER.
APPLICATION FILED JAN. 11, 1917.
1,240,880.
Patented Sept. 25, 1917.
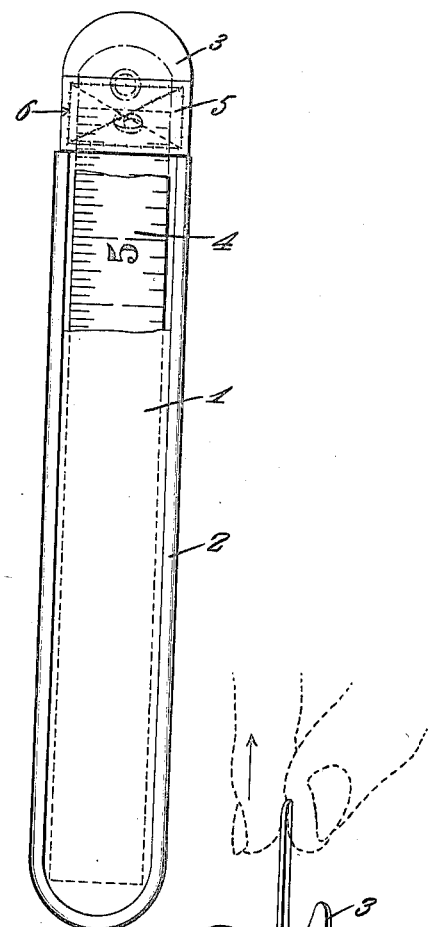
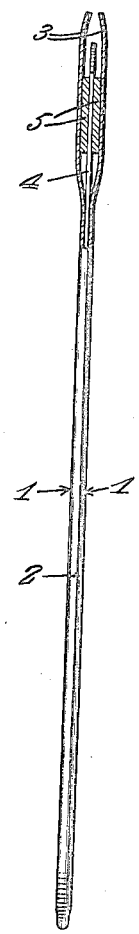
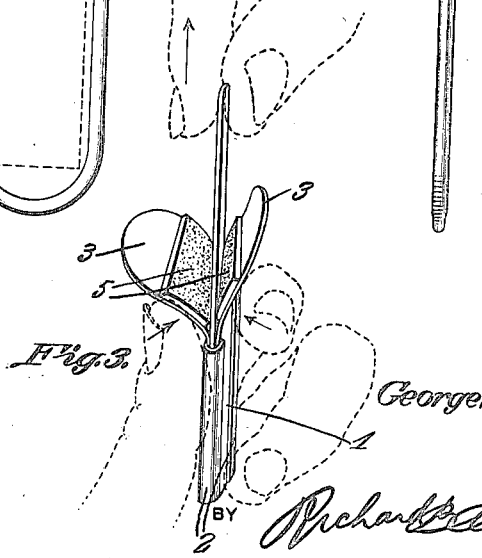
George W. Rink, INVENTOR
WITNESSES
ATTORNEY

UNITED STATES PATENT OFFICE.

GEORGE W. RINK, OF WASHINGTON, PENNSYLVANIA.

COMBINED SCALE SHEATH AND CLEANER.

1,240,880. Specification of Letters Patent. Patented Sept. 25, 1917.

Application filed January 11, 1917. Serial No. 141,851.

*To all whom it may concern:*

Be it known that I, GEORGE W. RINK, a citizen of the United States, residing at Washington, in the county of Washington and State of Pennsylvania, have invented certain new and useful Improvements in Combined Scale Sheaths and Cleaners, of which the following is a specification.

My invention relates to improvements in holders or sheaths for mechanics' scales, and it consists in the constructions, and arrangements herein described and claimed.

An object of my invention is to provide a sheath or guard for holding metallic scales as used by mechanics and more particularly by machinists, the sheath embodying means whereby the surface of the scale may be lubricated and cleansed from dirt as it is put into the sheath and taken therefrom.

Other objects and advantages will appear from the following specification, reference being had to the accompanying drawing forming a part thereof, in which:

Figure 1 is a side elevation of the sheath, a portion thereof being broken away to illustrate the position of the scale therein, Fig. 2 is a side elevation of the sheath a portion thereof being shown in section, and Fig. 3 is a detail perspective view illustrating the use of the sheath.

It is commonly known by those who have had experience in handling machinists' tools, that corrosion of the surface of a tool frequently results from the handling of the tool and collection thereon of the insensible perspiration from the fingers. This is particularly true in the use of mechanics' scales. These scales are usually polished very brightly, the figures and lines indicating the dimensions thereon, being blackened so as to contrast with the polished surface of the scale.

My invention is directed more particularly toward providing a sheath for a mechanic's scale, which embodies the additional feature of a wiper or cleaner for the scale as well as of a means for lubricating the scale to prevent it from rusting.

In carrying out my invention I provide a sheath or holder including the leather sides 1. The sides 1 are secured together and bound on the perimeter by a metallic binding 2, as is clearly shown in Fig. 1. The sides 1 of the sheath extend beyond the upper ends of the binding 2, so as to provide the loose flaps 3. A mechanic's scale 4 may be inserted between the flaps 3 and into the sheath as is shown in Fig. 1 and for a purpose which requires no further explanation.

The construction of the sheath as described thus far, is a common one, but in order to carry out the purpose of my invention I provide pads 5 on the adjacent surface of each of the loose flaps 3. The pads 5 are rectangular in shape, and are of such dimensions that they will cover the flaps 3 from side to side. The pads 5 are of felt or of any other suitable material which is capable of absorbing a lubricant and may be sewed to the flaps 3 as at 6.

It is a common practice in machine shops, to have a wad of oil soaked waste at hand with which the scale may be rubbed to remove dirt and moisture. On a bench where there are a great number of tools, the wad of waste easily becomes lost with the result that the scale is often put away without cleaning whereupon the polished surface soon becomes dulled and disfigured. Specks of dirt collecting on the scale are often mistaken for a dimension line, and where care is not taken to wipe the scale before using it, a defective piece of work may result.

In the use of my sheath, the felt pads 5 are soaked with oil. The sheath is now taken into the hand with the thumb and index finger pressing against the sides of the loose flaps 3, somewhat in the manner indicated in Fig. 3. The scale 4 is now inserted between the lubricated pads 5, and thrust into the sheath, the pressure of the thumb and index finger being maintained against the pads. The action of thrusting the scale into the sheath simultaneously removes all accumulations of dirt and moisture from the scale, at the same time spreading a thin film of lubricant over the surface thereof.

Now upon withdrawing the scale from the sheath the pressure of the thumb and index finger is maintained against the pads and the scale similarly as when it was inserted. The scale will again be wiped, a thin film of lubricant being left thereon, and the scale will be brightly polished with the dimension figures and lines strongly contrasted thereagainst. It will thus be seen that I have provided a sheath which not only serves as a holder for a mechanic's scale, but it serves to automatically cleanse and polish the scale thus increasing the efficiency of its use and protecting it from rust.

While the essential feature of the invention lies in the provision of lubricant absorbing material disposed at the mouth of a mechanic's scale sheath, and in the present instance is illustrated as consisting of felt pads, obviously variations in the arrangement of such lubricant distributing pads may be made without departing from the spirit of the invention or the scope of the claim.

I claim:

A scale sheath consisting of a flexible body having a metallic binder, the body terminating in loose flaps beyond the ends of the binder, and oiling pads attached to the flaps in positions entirely beyond the ends of the binder, whereby the pads may be moved entirely away from a scale as it is inserted into or withdrawn from the sheath to avoid an excessive application of oil to the scale.

In testimony whereof I affix my signature in presence of two witnesses.

GEORGE W. RINK.

Witnesses:
WM. G. LYTLE,
C. J. SCHANS.